United States Patent Office 3,780,017
Patented Dec. 18, 1973

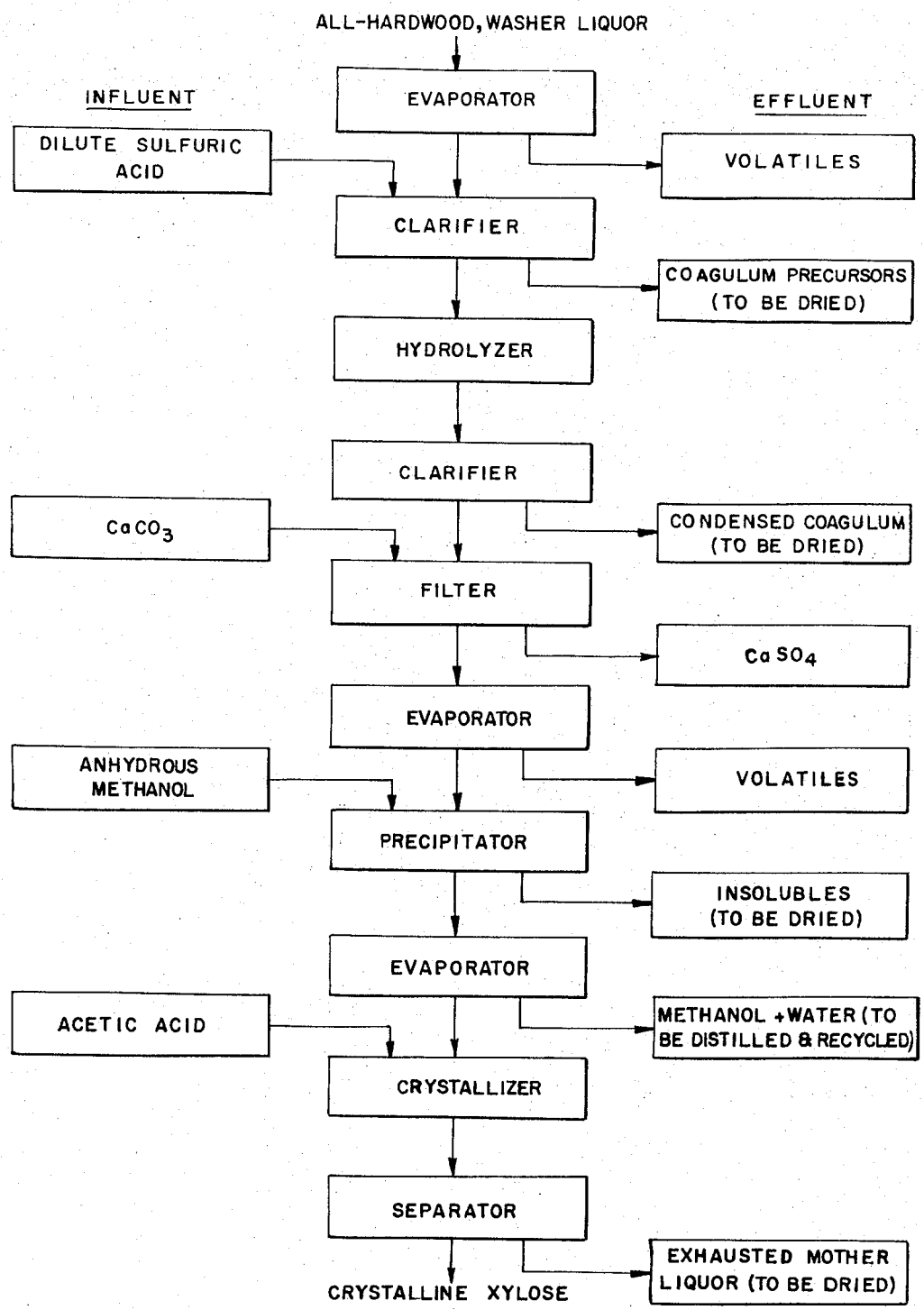

3,780,017
PRODUCTION OF CRYSTALLINE XYLOSE
Howard A. Spalt, Geneva, Chung Ying Chu, St. Charles, and Paul Niketas, Carpentersville, Ill., assignors to Masonite Corporation, Chicago, Ill.
Filed Feb. 25, 1971, Ser. No. 118,768
Int. Cl. C13k 9/00
U.S. Cl. 260—209 R
6 Claims

ABSTRACT OF THE DISCLOSURE

Method of isolating crystalline xylose from an aqueous plant extract containing monosaccharides of which at least 50 percent is xylose, which comprises concentrating said extract to a first syrup, dissolving said syrup in a water-miscible alcohol, removing insoluble materials from the alcohol solution, evaporation of the alcohol solution to a second syrup, diluting said second syrup with acetic acid to form a solution containing at least 25 percent acetic acid, and separating the crystalline xylose which is precipitated from said solution.

PRODUCTION OF CRYSTALLINE XYLOSE

This invention relates to the production of crystalline D-xylose. More particularly, it relates to production of crystalline xylose from xylan of xylan-rich woods.

BACKGROUND OF THE INVENTION

Xylose is a pentose which has a sweetness about half that of sucrose. It can be hydrogenated to xylitol which is of value as a sweetening agent, being approximately as sweet as sucrose and being metabolized without insulin in humans, providing a ready source of energy for diabetics.

Xylose is known to be widely distributed in plant materials, especially in hardwood (e.g., maple, cherry), in straw, in seed hulls, and in corn cobs. It does not occur in the free state in plants but usually in the form of xylan, a polysaccharide composed of D-xylose units which occurs in association with cellulose. It also occurs as part of glycosides. Practical sources of xylose include corn cobs, peanut shells and cottonseed hulls.

Despite its wide occurrence in nature, xylose is difficult to produce commercially because of the problems encountered in separating it from other natural products, particularly other carbohydrates such as glucose. Aqueous extracts of plants and hydrolysis liquors from xylan-containing materials form viscous syrups from which the recovery of xylose has been complicated and expensive.

It is an object of this invention to provide a method for isolating xylose from plant materials. Another object is to provide a procedure of separating xylose from carbohydrate syrups from botanical sources. A further object is to provide a method of producing crystalline D-xylose. These and other objects are apparent from and are achieved in accordance with the following disclosure.

BRIEF DESCRIPTION OF THE DRAWING

The single-figure drawing is a flow sheet illustrating the operations involved in the treatment of xylan-rich hardboard washer liquor, an aqueous extract of wood fiber furnish produced during the manufacture of hardboard, to obtain crystalline xylose according to a preferred embodiment of this invention. The various steps are shown by boxes which describe the equipment used, and hence the operation. The influent materials are shown in boxes on the left side and the effluent materials are listed in the right-hand boxes. The process illustrated is described in Example 1.

SUMMARY OF THE INVENTION

Briefly, the present invention comprises a procedure for isolating crystalline xylose from aqueous plant extracts by acid hydrolysis of the xylan or glycosides, neutralization, concentration of the aqueous solution, precipitation of impurities from the concentrate with a water-miscible alkanol, and crystallization of xylose from the aqueous concentrate diluted with acetic acid. In a specific embodiment, the invention is a process to crystallize xylose from aqueous extracts of hardboard furnishes. These extracts are obtained routinely in wet-process hardboard manufacture where water solubles are removed before fibers are formed into sheets and hot pressed into hardboard. See Boehm 2,224,135 and 2,431,163.

When xylose comprises over 50 percent of the monosaccharides in the aqueous extract after hydrolysis, approximately that amount of xylose in excess of 50 percent of the monosaccharides will crystallize out when processed as herein described. The exhausted mother liquor that is obtained after separation of the crystals contains xylose in amount equal to approximately 50 percent of the total sugars in that liquor, although values as low as 46 percent have been observed. Aqueous extracts that after hydrolysis contain over 50 percent of their monosaccharides as xylose are referred to herein as xylan-rich extracts.

The main features of the process are acid hydrolysis of the extract, followed by precipitation of impurities by an alkanol, and crystallization of xylose from acetic acid. Hydrolysis is required to reduce oligosaccharides to monosaccharides in order that they can be crystallized. Precipitation of resinous and poorly dissolved materials as an insoluble phase enables xylose crystallization to go forward to completion smoothly. Replacement of alkanol by acetic acid improves the rate of crystallization and the yield and purity of xylose produced because the sugar syrup is soluble in acetic acid whereas the xylose crystals are not.

DETAILED DESCRIPTION OF THE INVENTION

The raw material for the process is obtained from rotary vacuum filters that extract water and dissolved solids from xylan-rich wood furnish in a countercurrent fashion. The extracts obtained are concentrated to 10–40 percent solids (w./w.), clarified by filtration or centrifugation, and acidified with a mineral acid such as sulfuric, hydrochloric, or phosphoric. Acid hydrolysis is carried out at 100–140° C. in a suitable reactor fitted with agitation. Complete hydrolysis of the carbohydrates can be attained at 100° C. in 2–4 hours if dilute (10 percent) liquor is acidified to 2–3 percent. More rapid hydrolysis can be attained in 10–30 minutes at 140° C. with 1–5 percent acid. With the 140° C. temperature, liquors of 10–40 percent solids can be hydrolyzed readily.

For filtering, centrifuging, and hydrolysis, the solids content can be varied between 10–40 percent. The 10 percent level is used when pressure reactors are not available, but good results at 20–25 percent and acceptable results up to 40 percent solids are possible when temperature is increased to 140° C. Rapid hydrolysis of the high solids liquors increases reactor productivity enormously so it is preferable to work between 20–40 percent solids.

After hydrolysis, insolubles that form during the cook can be removed by filtration or centrifugation. Calcium carbonate, lime, soda, or other alkali is added to neutralize the acid to pH 4–5 and any insoluble salt that forms can be removed by filtration or centrifugation. The neutralized hydrolyzate is concentrated to a thick syrup (60–80 percent solids, usually about 75 percent). Hydrolysis and filtration greatly reduce the liquor viscosity at comparable solids so extremely high solids solutions are manageable. But if the syrup is too thick, mixing with alkanol at room temperature is impaired. If the syrup is too thin, complete precipitation of alkanol insolubles is precluded by the solvent power contributed by the water. Thus, the range of 60–80 percent solids in the aqueous syrup before alkanol precipitation is preferable.

About one volume of syrup so produced is dissolved into about ten volumes of alkanol. Greater or lesser volumes of alkanol can be used and the alkanol can be at any temperature from 0° C. to boiling with satisfactory results being obtained at room temperature. The insoluble phase that forms in the alkanol is removed by filtration or centrifugation, and the alkanol solubles concentrated to a thick syrup (50–70 percent solids). One volume of the syrup is mixed with 1–2 volumes of glacial acetic acid and the remaining water and alkanol removed by vacuum evaporation until a syrup is obtained containing at least 25% acetic acid. Xylose crystallizes spontaneously from this liquor. White crystals of xylose can be separated from the mother liquor by filtration with several washes of fresh acetic acid at or below room temperature. The acetic acid is removed readily by drying in heated air or in vacuum. The final product of xylose is obtained in high purity. The solvents do not azeotrope and thus can be recovered in pure form by fractional distillation.

A 50 percent syrup is preferably mixed with an equal volume of acetic acid whereas a 70 percent syrup is preferably mixed with two equal volumes of acetic acid. This is done so that the final concentration of solids in the acetic acid mother liquor will be about 50 percent. Thinner and thicker mother liquors crystallize slower and less completely. A mother liquor solids concentration should be 40–60 percent solids with 50 percent preferable.

The aqueous syrup is very fluid at high solids but the fluidity of the syrup decreases in alkanol and even more in acetic acid. The solids are being transferred into solvents of decreasing solvent power in order to foster crystallization and this trend shows up in viscosity changes.

The alkanols which can be used in this procedure include the water-miscible alcohols such as methanol, ethanol, 1-propanol, 2-propanol and t-butyl alcohol. The solubility of the simple sugars in the alcohol-water solution decreases as the alcohol series is ascended and the solubility of resinous materials increases. Thus, for precipitation of resinous solids, methanol is preferred. n-Butyl alcohol, which is immiscible with water, has been used to extract resinous substances from the aqueous hydrolyzate but it often produces gummy mother liquors which required treatment with charcoal before xylose could be precipitated therefrom.

The invention is disclosed in further detail by the following examples which are provided merely for purposes of illustration. It will be apparent to those skilled in the art that various modifications in equivalent materials, operating conditions, concentrations and the like can be made without departing from the invention described herein. Throughout this specification percentages are by weight.

Example 1

126 pounds of green hardwood chips containing 33.6 percent moisture were charged into a high-pressure steam cylinder of the gun type. Steam was introduced into the gun and steam pressure was allowed to build up to 600 p.s.i.g. over a span of 120 seconds, at which time the gun was opened through a hydraulic valve and the contents blown into a cyclone where steam and exploded fiber were separated. A total of 160.5 pounds of fiber was collected at a moisture content of approximately 50 percent. 160.5 pounds of water were added to the fiber with agitation after which 160 pounds of aqueous extract was expressed by pressing in a hydraulic press. This extract was concentrated to 50.5 percent solids in vacuum. The concentrate weighed 16.85 pounds and contained 8.5 pounds of solids, which was 10.2 percent of the total wood solids originally charged into the gun.

297 grams of this liquor containing 150 grams of solids were added to 800 ml. of water with agitation. The dilute liquor was filtered to remove suspended solids and acidified with 45 grams of 100% sulfuric acid and diluted to 1500 grams total liquor weight. Hydrolysis was carried out at 100° C. at reflux for two hours after which a second filtration removed insolubles formed during hydrolysis. The hydrolyzate was neutralized with $CaCO_3$ (67 grams) to pH 4.8 and $CaCO_4$ precipitate filtered out. The neutralized hydrolyzate was concentrated at or below 60° C. in vacuum to a thick syrup (over 60 percent solids) and a volume of methanol 10 times larger than the volume of syrup was added with agitation. Methanol insolubles totaling 11.4 grams were removed by filtration and the filtrate concentrated to a thick syrup to which two volumes of glacial acetic acid were added. This solution was concentrated to a thin syrup from which 50.1 grams of crystalline xylose separated, representing 33.4 percent of the solids originally charged into the process.

Example 2

Green, hardwood chips were treated in a manner similar to Example 1 except that a mild steam treatment was used. This involved introducing steam into the cylinder containing chips and raising the steam pressure to 350 p.s.i.g. in 65 seconds, then rapidly to 600 p.s.i.g. followed by discharge to the cyclone. The liquor obtained from the fiber was concentrated to 42.8 percent solids and stored. Analysis of its solids revealed them to be 51 percent sugars after hydrolysis of which xylose was 74 percent of the sugars.

350 grams of this liquor containing 150 grams of solids were processed as in Example 1. 30.8 grams of xylose crystallized out, representing 20.5 percent of the solids originally charged into the process.

Example 3

A liquor extracted by the countercurrent washers from a hardboard operation using all hardwood chips (xylan-rich species) were obtained and analyzed. It was found to contain 42 percent reducing sugars on solids after hydrolysis of which 73 percent of the sugars was xylose.

221 grams of the liquor containing 150 grams of solids were processed as in Example 1. Xylose equal to 31.5 grams crystallized from acetic acid.

Example 4

A liquor derived from sulfite pulping of all-hardwood chips was found to contain 29 percent reducing sugar on solids after hydrolysis of which xylose comprised 85 percent of the sugars.

A sample containing 10 grams of solids was processed as in Example 1 including hydrolysis. Xylose crystallized from acetic acid solution but difficulty in separating crystals from a viscous, sticky mass precluded quantitating yield.

We claim:

1. Method of isolating crystalline xylose from an aqueous plant extract containing monosaccharides of which at least 50 percent is xylose, which comprises
   (a) concentrating said extract to a first syrup,
   (b) adding a water-miscible alcohol to said syrup in an amount sufficient to precipitate a substantial portion of the impurities present in said syrup without precipitating a substantial portion of the xylose in said syrup,
   (c) removing insoluble materials from the alcohol solution,
   (d) evaporating the alcohol solution to a second syrup,
   (e) diluting said second syrup with acetic acid to form a solution containing at least 25 percent acetic acid to precipitate crystalline xylose, and
   (f) separating the crystalline xylose from said solution.

2. Method of claim 1 wherein the aqueous plant extract is an acid-hydrolyzed extract of hardwood.

3. Method of claim 2 wherein aqueous plant extract is xylan-rich washer liquor from a hardwood plant.

4. Method of claim 1 wherein the alcohol is methanol.

5. Method of claim 1 wherein the alcohol is ethanol.

6. Method of claim 1 wherein the first syrup is concentrated to about 60% to 80% solids and wherein the second syrup is concentrated to about 50% to 70% solids.

References Cited
UNITED STATES PATENTS

| | | | |
|---|---|---|---|
| 2,073,616 | 3/1937 | Acree | 260—209 R |
| 2,218,567 | 10/1940 | White | 260—209 R |

LEWIS GOTTS, Primary Examiner

J. R. BROWN, Assistant Examiner